United States Patent
Clevorn et al.

(10) Patent No.: US 9,716,667 B2
(45) Date of Patent: Jul. 25, 2017

(54) COMMUNICATION TERMINAL AND METHOD FOR CONTROLLING A DATA TRANSMISSION

(71) Applicant: Intel IP Corporation, Santa Clara, CA (US)

(72) Inventors: Thorsten Clevorn, Munich (DE); Christian Drewes, Germering (DE); Divyaprakash Bhojkumar, Whitehall, PA (US); Suresh Kalyanasundaram, Munich (DE); Rafal Ciechanowski, Kopanino (PL); Habib Djandji, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 189 days.

(21) Appl. No.: 14/472,396

(22) Filed: Aug. 29, 2014

(65) Prior Publication Data
US 2016/0066335 A1 Mar. 3, 2016

(51) Int. Cl.
*H04L 12/919* (2013.01)
*H04L 12/825* (2013.01)
(Continued)

(52) U.S. Cl.
CPC ........ *H04L 47/765* (2013.01); *H04L 41/0896* (2013.01); *H04L 47/14* (2013.01);
(Continued)

(58) Field of Classification Search
CPC ..... H04W 47/11; H04W 47/12; H04W 47/14; H04W 47/18; H04W 47/22; H04W 47/225; H04W 47/25; H04W 47/27; H04W 80/06; H04W 28/0231; H04W 28/0236; H04W 28/0242; H04W 28/0273; H04W 28/0289; H04W 28/12; H04W 28/22; H04W 72/085; H04L 47/765; H04L 47/27; H04L 47/14; H04L 47/25; H04L 41/0896; H04L 69/16; H04L 69/24
See application file for complete search history.

(56) References Cited

U.S. PATENT DOCUMENTS

| 2006/0056300 | A1* | 3/2006 | Tamura | H04L 12/5602 370/235 |
| 2006/0227743 | A1* | 10/2006 | Ishimori | H04L 1/1671 370/331 |
| 2013/0176854 | A1* | 7/2013 | Chisu | H04W 80/06 370/241 |

* cited by examiner

Primary Examiner — Joshua Kading
(74) Attorney, Agent, or Firm — Viering, Jentschura & Partner mbB

(57) ABSTRACT

A communication terminal is described comprising a quality determiner configured to determine a quality parameter for a wireless communication link between the communication terminal and a radio access network component based on one or more signals received via the wireless communication link, a throughput determiner configured to determine, based on the quality parameter, a throughput of a communication connection between the radio access network component and a server to be used for transmitting data from the server to the communication terminal via the communication connection and the wireless communication link and a controller configured to send an instruction for the server to transmit data via the communication connection between the radio access network component and the server according to the determined throughput.

20 Claims, 10 Drawing Sheets

(51) Int. Cl.
*H04W 72/08* (2009.01)
*H04L 12/24* (2006.01)
*H04L 12/807* (2013.01)
*H04L 12/801* (2013.01)
*H04W 28/22* (2009.01)
*H04L 29/06* (2006.01)

(52) U.S. Cl.
CPC .............. *H04L 47/25* (2013.01); *H04L 47/27* (2013.01); *H04W 28/22* (2013.01); *H04W 72/085* (2013.01); *H04L 69/16* (2013.01); *H04L 69/24* (2013.01)

COMMUNICATION TERMINAL AND METHOD FOR CONTROLLING A DATA TRANSMISSION

TECHNICAL FIELD

Embodiments described herein generally relate to communication terminals and methods for controlling a data transmission.

BACKGROUND

Modern mobile terminals such as smartphones are often used for accessing the Internet and downloading data. Typically, the wireless link, e.g. to a base station of cellular communication network granting the mobile terminal access to the Internet, forms the bottleneck for a connection to the Internet in such a scenario. This may lead to effects that reduce the throughput below what would actually possible. Accordingly, approaches for avoiding such effects and maximizing throughput in such scenarios are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
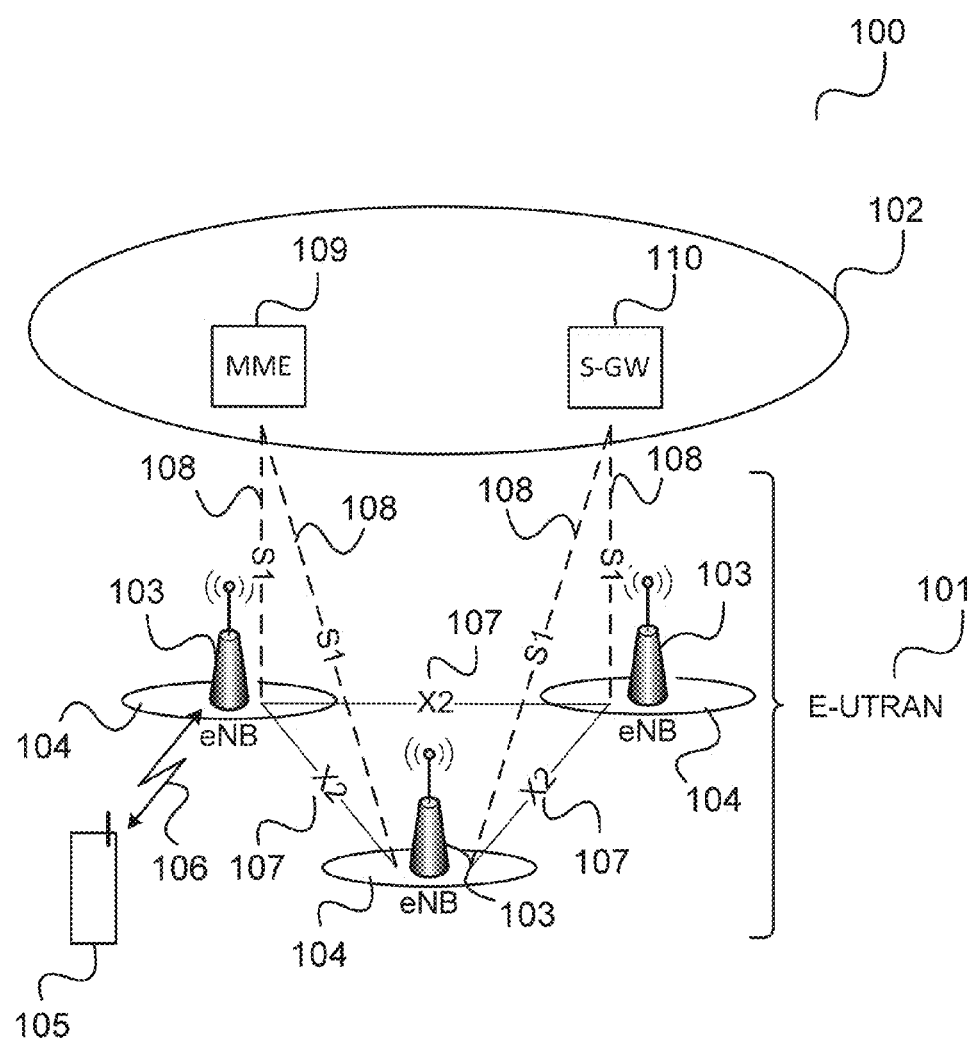
FIG. 1 shows a communication system according to a mobile communication standard, such as LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications) etc.

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S 1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

Figure 2:
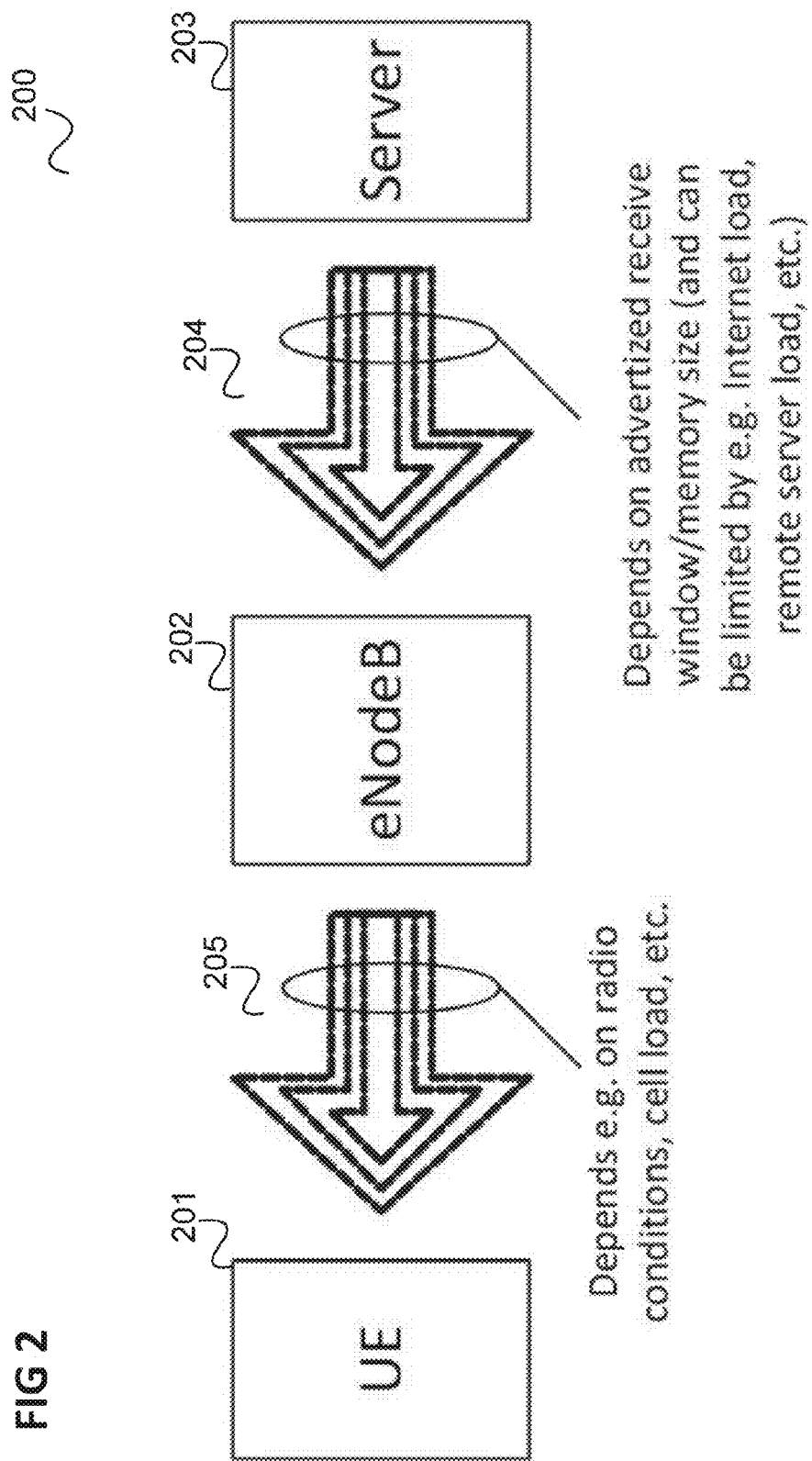
FIG. 2 shows a communication arrangement illustrating a connection between a mobile terminal and a server.

A TCP downlink connection between a server and a mobile device such as mobile terminal (e.g. a UE) 105 can be separated in two part as shown in FIG. 2.

FIG. 2 shows a communication arrangement 200.

The communication arrangement 200 includes a mobile terminal (a UE according to LTE in this example) 201, for example corresponding to the mobile terminal 105, a base station 202, (an eNodeB according to LTE in this example), for example corresponding to the base station 103 serving the mobile terminal 105, and a server 203, e.g. an FTP server located in the Internet.

The server 203 transmits data to the mobile terminal via a first connection 204 between itself and the base station 202 and a second connection 205 between the base station 202 and the mobile terminal 201, for example via the air interface 106.

The available throughput of the connections 204, 205, or, in other words, the volume of the throughput pipe in both sections depends on different parameters.

The eNodeB-UE pipe, i.e. the second connection 205, e.g. depends on the radio conditions, cell load, etc. while the Server-eNodeB pipe, i.e. the first connection 204 depends on the (maximum) TCP window/memory size (also referred to as TCP receive window size) the TCP stack on the UE 201 advertises (i.e. signals) to the server 203 (and can be limited by e.g. Internet load, remote server load, etc.). For fixing the maximum TCP window/memory size the overall maximum possible throughput should be considered which can even include data traffic of other transmission standards like WLAN (Wireless Local Area Network), USB (Universal Serial Bus), etc. if they share the same TCP stack on the UE 201.

Figure 3:
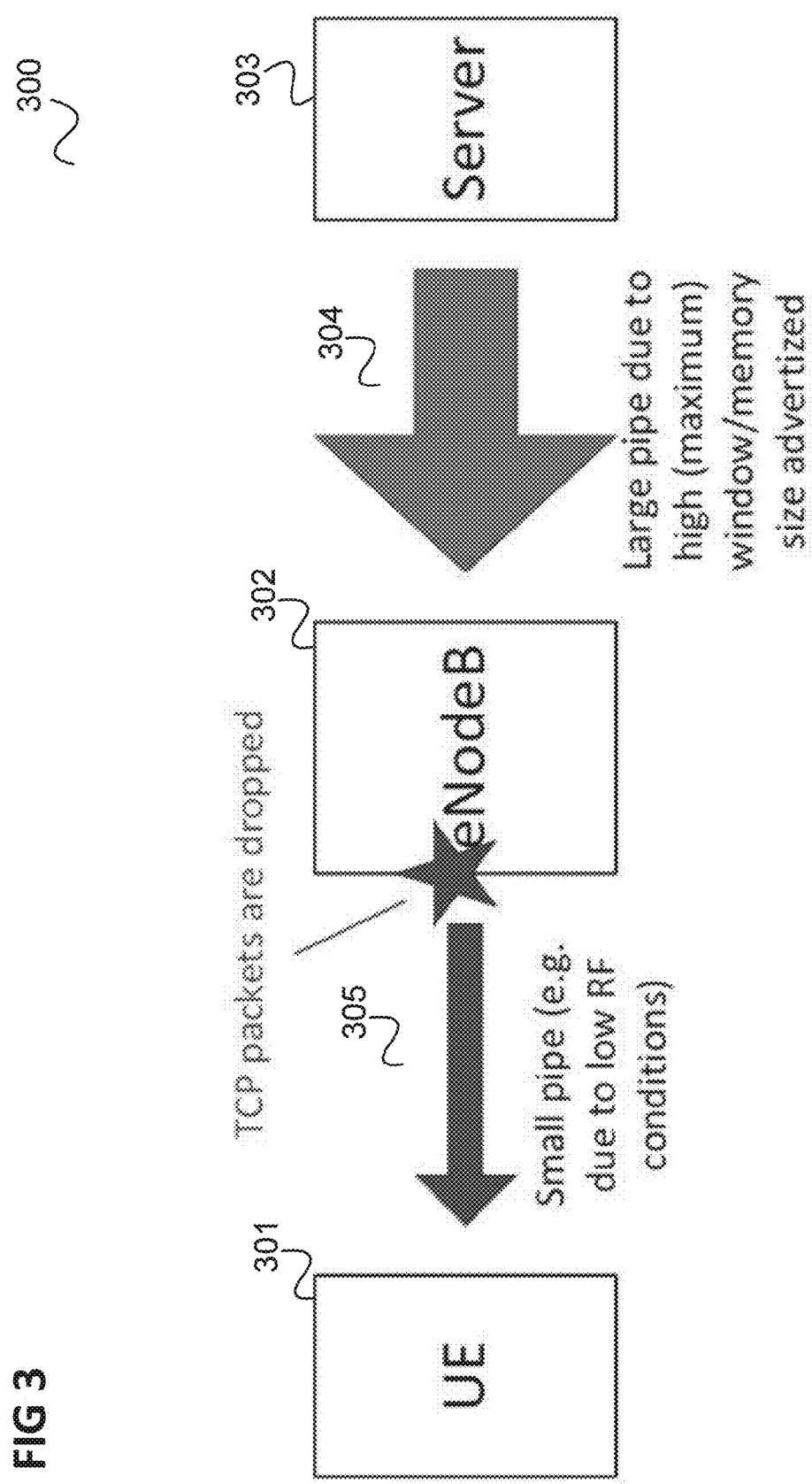
FIG. 3 illustrates a possible dropping of TCP packets in the communication arrangement of FIG. 2.

A TCP window/memory size that is too large can lead to a problem as illustrated in FIG. 3.

FIG. 3 illustrates a possible dropping of TCP packets in the communication arrangement of FIG. 2.

The communication arrangement 300 of FIG. 3 corresponds to the communication arrangement 200 and accordingly comprises a mobile terminal 301, a base station 302 and a server 303 with a first connection 304 and a second connection 305.

In the example the throughput on the wireless link, i.e. the second connection 305, is low due to bad RF (radio frequency) conditions (indicated with a narrow arrow). Nevertheless, the advertised TCP window/memory size to the server 303 is larger (indicated with a wider arrow), i.e. the server pumps a high amount of TCP packets to the eNodeB 302. As the eNodeB 302 cannot send all of them in time to the UE 301 it drops some TCP packets. As a consequence, the UE 301 misses some TCP packets and sends duplicate ACKs (for the last in sequence packet) to the server 303 to indicate missing packets. By this the congestions avoidance algorithm at the server 303 is triggered which may lead to a drastic drop in throughput, even far below the possible throughput on the wireless link 305.

Figure 4:
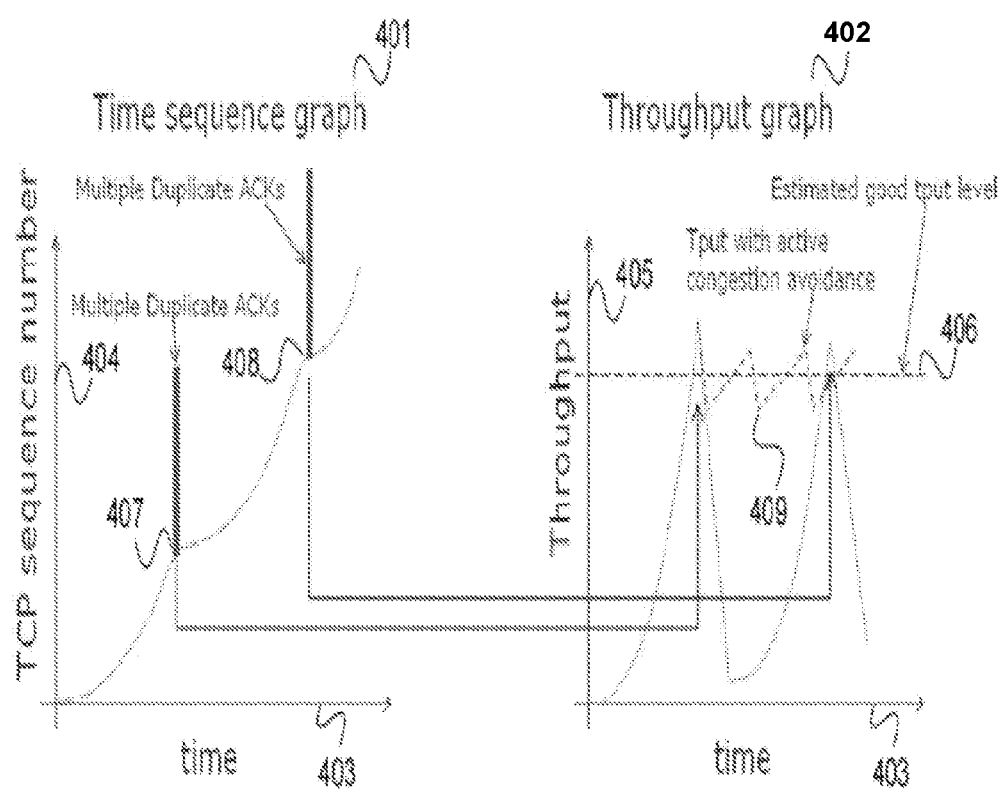
FIG. 4 shows a time sequence graph and a throughput graph for the scenario of FIG. 3.

FIG. 4 shows a time sequence graph 401 and a throughput graph 402 illustrating this problem.

For both graphs 401, 402, time increases from left to right along time axes 403. In the time sequence graph 401, the TCP sequence number of a packet sent at a certain time is indicated in accordance with a TCP sequence number axis 404, wherein the TCP sequence numbers increase from bottom to top. For the throughput graph 402 throughput increases from bottom to top along a throughput axis 405. A dashed line 406 in this example indicates the possible throughput.

In this example, TCP packets are lost such that at a first point in time 407 the UE reacts with one or more duplicate ACKs (acknowledgement messages) which results in a drop in throughput, since, for example, the server 303 reacts with a slow start.

The throughput then rises again until, at a second point in time 408, the mobile terminal sends one or more duplicate ACKs and the throughput drops again as a result of the server's reaction.

It should be noted that the server 303 may also react to the duplicate ACKs at the with an active congestion avoidance which gives rise to a "sawtooth" behavior of the throughput as indicated by a dashed graph 409. However, a high number of simultaneous duplicate ACKs typically trigger a slow start as indicated by the throughput graph 401. It can be observed that in wireless networks, differently to e.g. fixed networks, often the RTT (round trip time) of a connection is very large which results in multiple duplicate ACKs being created until the server can react to the duplicate ACKs. Thus, the server 303 may see multiple duplicate ACKs and suspect a very critical scenario and start the TCP flow from scratch, e.g. with slow start.

It should further be noted that approaches like mobile-TCP (M-TCP) are typically not compatible with TCP and can thus only be applied in proprietary networks. However, modern mobile networks with smartphones connected to the Internet typically rely on basic TCP to be used.

In the following, an approach is described which may be implemented without changing the TCP protocol stack and thus may be implemented to be fully compatible and compliant to existing networks.

Figure 5:
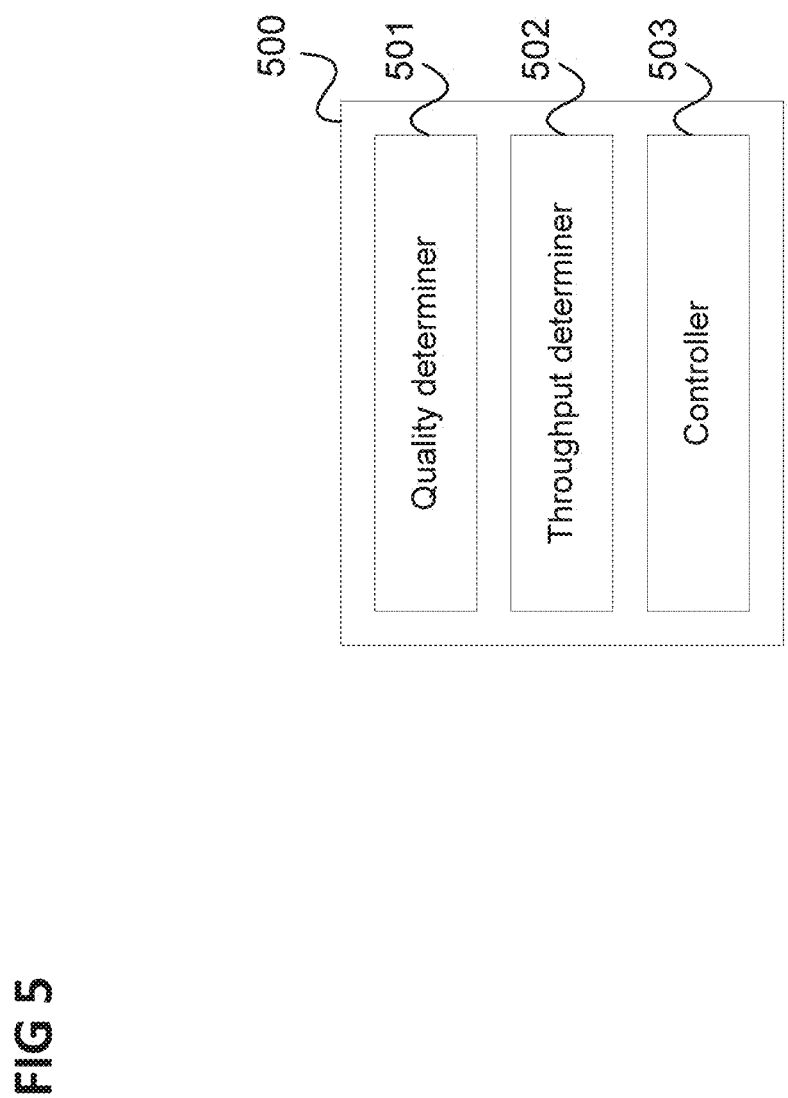
FIG. 5 shows a communication terminal.

FIG. 5 shows a communication terminal 500.

The communication terminal 500 comprises a quality determiner 501 configured to determine a quality parameter for a wireless communication link between the communication terminal and a radio access network component (e.g. a base station) based on one or more signals received via the wireless communication link.

Further, the communication terminal 500 comprises a throughput determiner 502 configured to determine, based on the quality parameter, a throughput of a communication connection between the radio access network component and a server to be used for transmitting data from the server to the communication terminal via the communication connection and the wireless communication link.

The communication terminal 500 further comprises a controller 503 configured to send an instruction for the server to transmit data via the communication connection between the radio access network component and the server according to the determined throughput.

In other words, for example, a communication terminal (e.g. a mobile terminal such as a mobile phone or a tablet computer) sets the throughput to be used for transmission of data from a server to a radio access network component based on the quality of the its connection to the radio access network component. The communication terminal may do this dynamically and for an established connection to the server. For example, the communication terminal may adapt (e.g. reduce) the maximum TCP window/memory size it advertises to the server to the possible throughput on a wireless link it has to the radio access network component. By that, it avoid triggering of congestion algorithms by packets dropped in the radio access network (e.g. at the radio access network component). The communication terminal may for example adapt the advertised maximum TCP window/memory size based on one or a combination of quality parameters or measurements of the wireless link such as an SNR or a round trip time (RTT) of the wireless link and may take additional parameters which characterize the performance of the wireless link such as a SIM (Subscriber Identity Module) card limit into account.

The components of the communication terminal (e.g. the quality determiner, the throughput determiner, the controller and the transceiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 6:
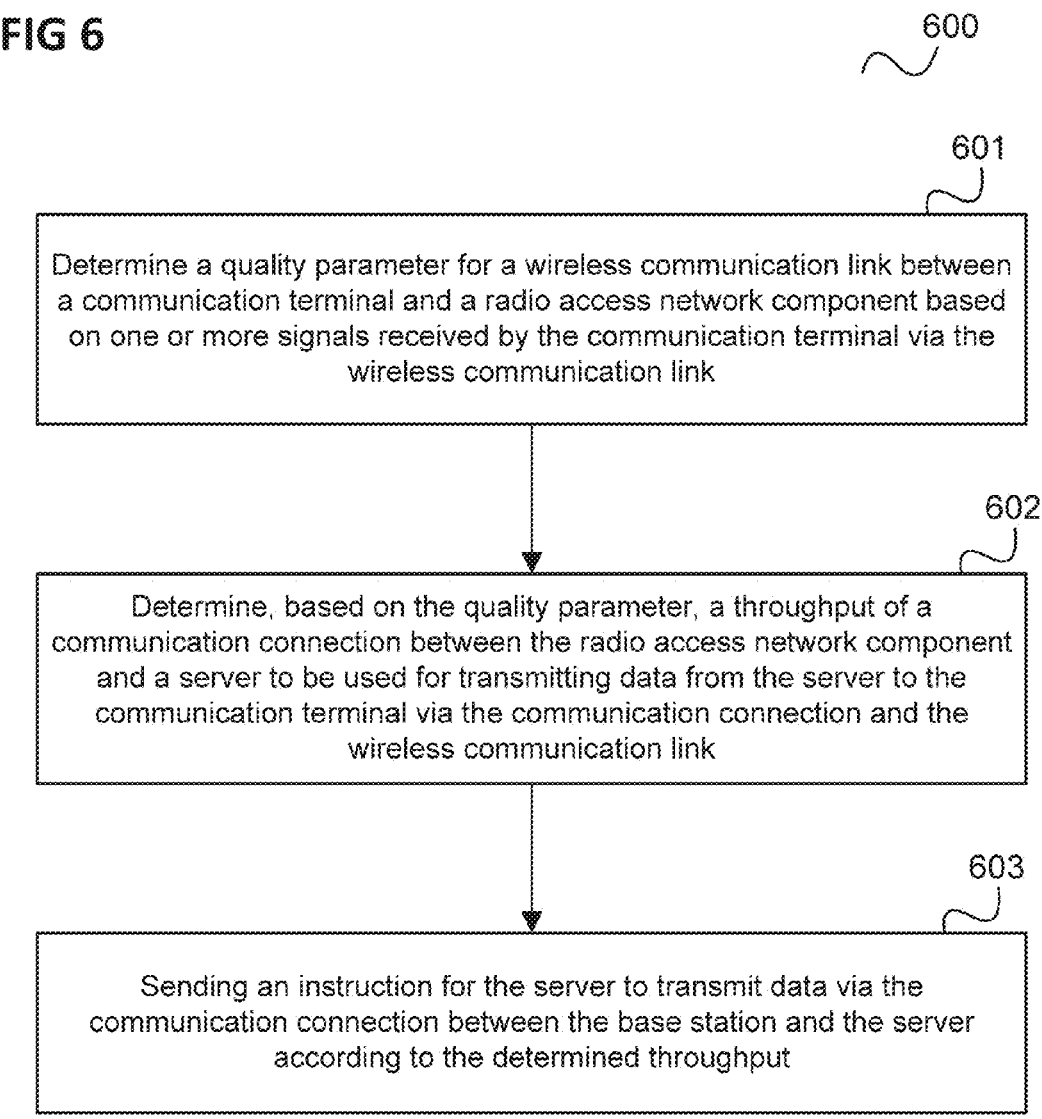
FIG. 6 shows a flow diagram illustrating a method for controlling a data transmission, e.g. carried out by a communication terminal.

The communication terminal for example carries out a method as illustrated in FIG. 6.

FIG. 6 shows a flow diagram 600 illustrating a method for controlling a data transmission, e.g. carried out by a communication terminal.

In 601, the communication terminal determines a quality parameter for a wireless communication link between a communication terminal and a radio access network component based on one or more signals received by the communication terminal via the wireless communication link.

In 602, the communication terminal determines, based on the quality parameter, a throughput of a communication connection between the radio access network component and a server to be used for transmitting data from the server to the communication terminal via the communication connection and the wireless communication link.

In 603, the communication terminal sends an instruction for the server to transmit data via the communication connection between the radio access network component and the server according to the determined throughput.

The following examples pertain to further embodiments.

Example 1 is a communication terminal as illustrated in FIG. 5.

In Example 2, the subject matter of Example 1 may optionally include the communication connection between the radio access network component and the server being a TCP connection.

In Example 3, the subject matter of Example 1 may optionally include that sending an instruction for the server to transmit data via the communication connection between the radio access network component and the server according to the determined throughput comprises signaling a throughput parameter based on the determined throughput to the radio access network component.

In Example 4, the subject matter of Example 3 may optionally include the controller being further configured to derive the throughput parameter from the determined throughput.

In Example 5, the subject matter of Example 3 may optionally include the connection between the radio access network component and the server being a TCP connection and the throughput parameter being a TCP receive window size.

In Example 6, the subject matter of Example 1 may include a receiver configured to receive data from the server via the communication connection and the wireless communication link.

In Example 7, the subject matter of Example 6 may optionally include the receiver being configured to receive one or more signals from the radio access network component and the quality determiner being configured to measure the quality parameter based on the reception of the one or more signals.

In Example 8, the subject matter of Example 7 may optionally include the quality parameter being based on a signal to noise measurement of the received one or more signals.

In Example 9, the subject matter of Example 1 may optionally include the quality parameter being a round trip time between the communication terminal and the server.

In Example 10, the subject matter of Example 1 may optionally include the throughput determiner being configured to determine the throughput based on the quality parameter and an additional parameter characterizing a performance of the wireless communication link.

In Example 11, the subject matter of Example 10 may optionally include the additional parameter specifiying a throughput limit of the wireless communication link or an amount of communication resources available for the wireless communication link.

In Example 12, the subject matter of Example 1 may optionally include the throughput determiner being configured to determine the throughput based on the quality parameter by means of a predetermined lookup table.

Example 13 is a method for controlling a data transmission as illustrated in FIG. 6.

In Example 14, the subject matter of Example 13 may optionally include the communication connection between the radio access network component and the server being a TCP connection.

In Example 15, the subject matter of Example 13 may optionally include that sending an instruction for the server to transmit data via the communication connection between the radio access network component and the server according to the determined throughput comprises signaling a throughput parameter based on the determined throughput to the radio access network component.

In Example 16, the subject matter of Example 15 may optionally include deriving the throughput parameter from the determined throughput.

In Example 17, the subject matter of Example 15 may optionally include the connection between the radio access network component and the server being a TCP connection and the throughput parameter being a TCP receive window size.

In Example 18, the subject matter of Example 13 may further include receiving data from the server via the communication connection and the wireless communication link.

In Example 19, the subject matter of Example 18 may optionally include receiving one or more signals from the radio access network component and measuring the quality parameter based on the reception of the one or more signals.

In Example 20, the subject matter of Example 19 may optionally include the quality parameter being based on a signal to noise measurement of the received one or more signals.

In Example 21, the subject matter of Example 13 may optionally include the quality parameter being a round trip time between the communication terminal and the server.

In Example 22, the subject matter of Example 13 may optionally include determining the throughput based on the quality parameter and an additional parameter characterizing a performance of the wireless communication link.

In Example 23, the subject matter of Example 22 may optionally include the additional parameter specifying a throughput limit of the wireless communication link or an amount of communication resources available for the wireless communication link.

In Example 24, the subject matter of Example 13 may optionally include determining the throughput based on the quality parameter by means of a predetermined lookup table.

Example 25 is a computer readable medium having recorded instructions thereon which, when executed by a processor, make the processor perform a method for controlling a data transmission according to any one of Examples 13 to 24.

Example 26 is a communication terminal comprising a quality determining means for determining a quality parameter for a wireless communication link between the communication terminal and a radio access network component based on one or more signals received via the wireless communication link, a throughput determining means for determining, based on the quality parameter, a throughput of a communication connection between the radio access network component and a server to be used for transmitting data from the server to the communication terminal via the communication connection and the wireless communication link and a controlling means for sending an instruction for the server to transmit data via the communication connection between the radio access network component and the server according to the determined throughput.

In Example 27, the subject matter of Example 26 may optionally include the communication connection between the radio access network component and the server being a TCP connection.

In Example 28, the subject matter of Example 26 may optionally include that sending an instruction for the server to transmit data via the communication connection between the radio access network component and the server according to the determined throughput comprises signaling a throughput parameter based on the determined throughput to the radio access network component.

In Example 29, the subject matter of Example 28 may optionally include the controlling means being for deriving the throughput parameter from the determined throughput.

In Example 30, the subject matter of Example 28 may optionally include the connection between the radio access network component and the server being a TCP connection and the throughput parameter being a TCP receive window size.

In Example 31, the subject matter of Example 26 may optionally include a receiving means for receiving data from the server via the communication connection and the wireless communication link.

In Example 32, the subject matter of Example 31 may optionally include the receiving means being for receiving one or more signals from the radio access network component and the quality determining means being for measuring the quality parameter based on the reception of the one or more signals.

In Example 33. the subject matter of Example 32 may optionally include the quality parameter being based on a signal to noise measurement of the received one or more signals.

In Example 34. the subject matter of Example 26 may optionally include the quality parameter being a round trip time between the communication terminal and the server.

In Example 35. the subject matter of Example 26 may optionally include the throughput determining means being for determining the throughput based on the quality parameter and an additional parameter characterizing a performance of the wireless communication link.

In Example 36. the subject matter of Example 35 may optionally include the additional parameter specifying a throughput limit of the wireless communication link or an amount of communication resources available for the wireless communication link.

In Example 37. the subject matter of Example 26 may optionally include the throughput determining means being for determining the throughput based on the quality parameter by means of a predetermined lookup table.

It should be noted that one or more of the features of any of the examples above may be combined with any one of the other examples.

In the following, examples are described in more detail.

As described above with reference to FIGS. 3 and 4, the maximum TCP window/memory size advertised by a mobile terminal 201 to a server 203 being fixed can lead to TCP packets being dropped at the base station 202.

Figure 7:
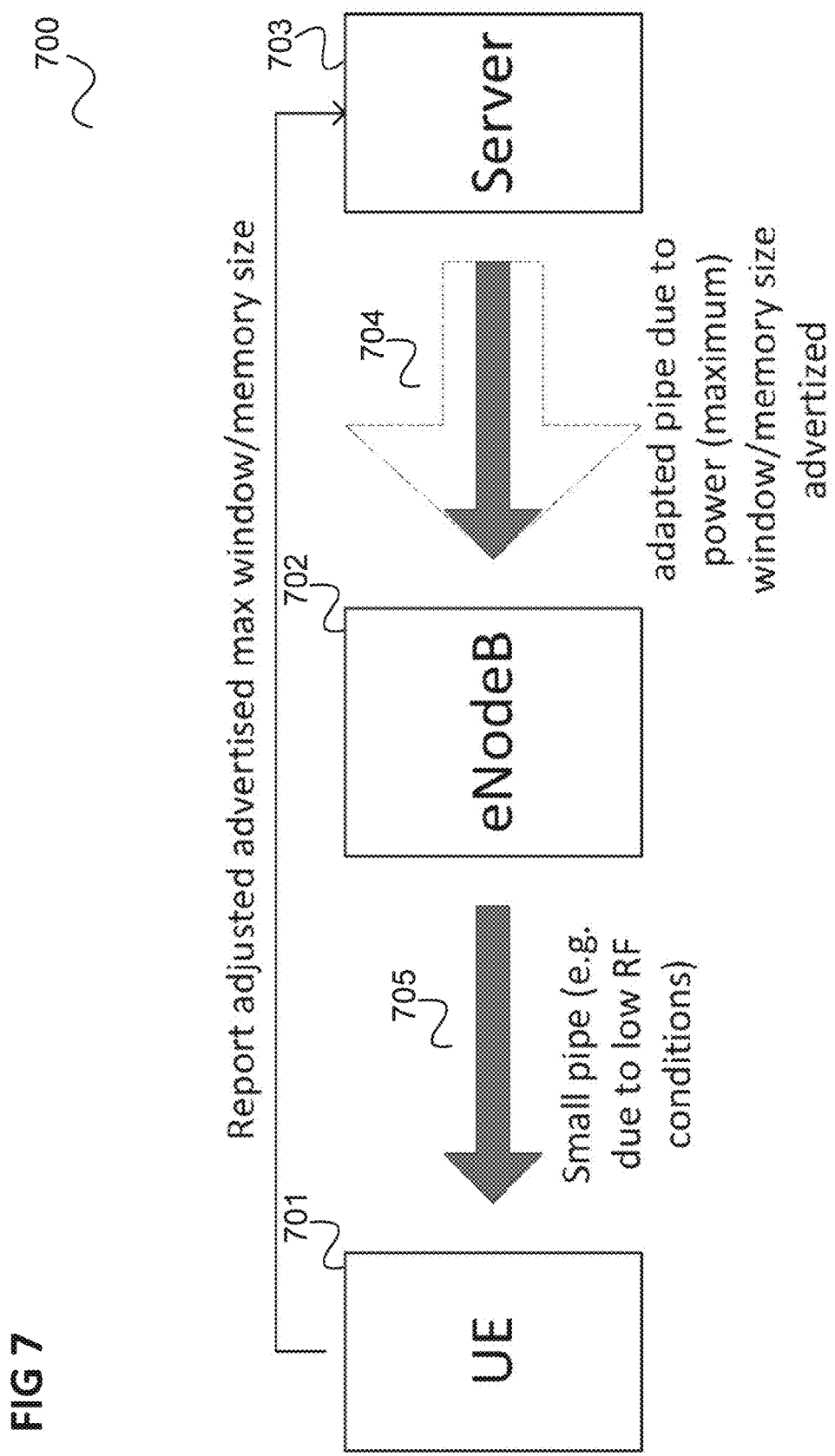
FIG. 7 illustrates an adjusting of the TCP window/memory size in the communication arrangement of FIG. 2.

In the examples described in the following, the throughput between the server 203 and the eNodeB 202, and therefore the amount of TCP packets sent out by the server 203 can be set to be roughly the same as the eNodeB 202 can actually forward to the UE 201, as illustrated in FIG. 7.

FIG. 7 illustrates an adjusting of the TCP window/memory size in the communication arrangement of FIG. 2.

The communication arrangement 700 of FIG. 7 corresponds to the communication arrangement 200 and accordingly comprises a mobile terminal 701, a base station 702 and a server 703 with a first connection 704 and a second connection 705.

In this example, the possible throughput of the second connection 705 is relatively low, e.g. due to bad RF conditions. Accordingly, the mobile terminal 701 reports an adjusted advertised maximum window/memory size to the server 203 which in response adapts (e.g. reduces) the throughput it uses for the first communication connection 704.

By that it can be achieved that the eNodeB 702 does not need to drop TCP packets because it can forward all TCP packets to the UE 701 in time.

It should further be noted that this approach may make data overload handling on some of the involved network elements (e.g. PDN (Packet Data Network)/Internet routers (if SIM limited) and eNodeB, S/P-GW, IP Backbone (if RF limited)) unnecessary (or prevent it from kicking in) and thus helps the network providing the end-to-end connection between the server 203 and the UE 201.

It should be noted that while in this and the other examples LTE terminology is used, similar approaches may also be applied to all other types of communication networks such as 2G, 3G, WLAN and wired communication networks etc.

The UE 701 adapts the maximum TCP window/memory to the wireless link 705 (or, more generally, the section with the lowest throughput in the transmission chain which is often the wireless link in bad condition), instead of using a fixed high value (which may even be simultaneously used for other/faster connections of the UE 701 like WLAN, USB, etc connections).

Thus, it can be avoided that TCP packets are discarded at the eNodeB 702. For the adaptation (often the reduction from an overall maximum value) the UE 701 can use quality measurements based of signals received from the base station 702 and additional parameters it knows. It may also combine several parameters to determine the adjusted window/memory size.

An example for an additional parameter the UE 701 may consider is a throughput limit by the SIM card. For example, The UE 701 may be capable of LTE Cat4 with 150 Mbps, but its SIM card limits the throughput to, e.g., 7.2 Mbps. The TCP memory/window is capable of supporting the 150 Mbps, but with the SIM card limitation the UE 701 knows that the maximum throughput it can achieve in the network is about factor 20 lower than the maximum throughput it supports. Thus, it lowers the advertised maximum TCP memory/window size. While the SIM limit is not enforced on the UE-eNB link 705 but typically in the core-network, the effect is similar. The SIM card limit may be known at the UE 701 or the UE 701 can infer it from observing the traffic.

Furthermore, using the round trip time (RTT) of the TCP packets (e.g. the time between an ACK transmission in uplink and the reception of the TCP packet triggered by the ACK in downlink) the UE 701 can estimate the possible maximum "data-on-the-fly", i.e. the amount of TCP data the server 703 should realistically transmit before receiving an ACK for older packets. Data-on-the-fly is then basically the combination of the RTT and the SIM card limit. The UE 701 can adjust the maximum TCP window/memory size accordingly. The RTT could be e.g. a theoretical minimum value (for a link via wireless network and a fixed network), a theoretical maximum value (what is maximally usually seen), or a value measured by the UE 701 itself during the data transfer (and then averaged, some margin added, etc.).

The UE 701 may for example determine the window/memory size based on one or more of the following parameters (but is not limited to these):

SIM card limit (which it may also infer from a measurement).

maximum throughput of the used wireless standard, e.g. 4G, 3G, 2G.

maximum throughput of the current radio configuration, e.g. band-width, carrier aggregation, network capabilities, . . . .

active applications (e.g. the information that a certain video streaming service that does require not more than a certain max throughput). This may include consideration of real-time requirements which can enable traffic shaping to reduce throughput requirements.

The UE 701 may for example determine the window/memory size based on one or more of the following measurements of signals (e.g. messages) received from the base station (but is not limited to these):

Signal and noise (and interference) measurements like SNR (signal to noise ratio), SINR (signal to interference and noise ratio), RSRP (received signal received power), RSSI (received signal strength indicator), RSRQ (received signal received quality), interference measurements of a neighboring cell, etc. The UE 701 for example reduces the maximum window/memory size when the signal and to noise ratio is below a certain value.

Round trip time from ACK messages in uplink to TCP packets in downlink. It should be noted that under the assumption of a symmetrical RTT for uplink and downlink, the uplink RTT may be easier to measure (time between uplink packet transmission to downlink ACK reception).

Uplink/downlink asymmetries.

The UE 701 may further determine the window/memory size based on one or more of the following information specific for wireless applications (but is not limited to this):

Antenna imbalance (if known by design this could also be a parameter). This may be known by design or also be measured during usage. For example, the user may cover one antenna with his hand and the UE's modem sees a difference between the antennas which limits the maximum throughput.

The actual share the UE 701 gets in its serving radio cell as the total throughput per cell has to be shared between users. Thus, e.g., the UE may perform a cell load measurement (e.g. by RSSI/RSRQ/ . . . ) or a measurement of the average resources the network schedules to the UE 701, i.e. in LTE the number of PRBs (physical resource blocks) in active TTIs (time transmission intervals) and the percentage of active TTIs. The maximum possible share the UE 701 can get would be the average PRBs times the average TTI activity times the maximum TBS (transport block size). Instead of the maximum TBS the UE 701 may also use the average measured TBS based on the average MCS (modulation and coding scheme).

The actual current throughput itself (e.g. increased by a certain margin; it is however unrealistic that the throughput increases by a factor of 10 in a very short time frame). For this, the UE 701 can use FBI (feedback indicator)-related measurements (like CQI (channel quality indicator) or rank indicator RI) as an indicator for the maximum achievable DL throughput. The UE 701 may scale the maximum throughput scaled by cell load indicators or scheduling ratios in frequency and time (e.g. it may take into account that during peak hours less resources are available per UE).

The UE 701 may do adaptations of the window/memory size constantly during a transmission (e.g. file transfer or streaming) or only once, e.g. when a scenario (e.g. a TCP connection or a download) starts or the used wireless standard is changed. The UE 701 may e.g. consider breaking, resetting, or reestablishing the TCP connection to the server 303 if with the adapted settings (i.e. the adjusted memory/window size) the throughput is expected to be better and an overall gain can be achieved. The UE 701 may give different settings and priorities to different simultaneous TCP connections, e.g. according to specific QoS requirements of the various connections.

Figure 8:
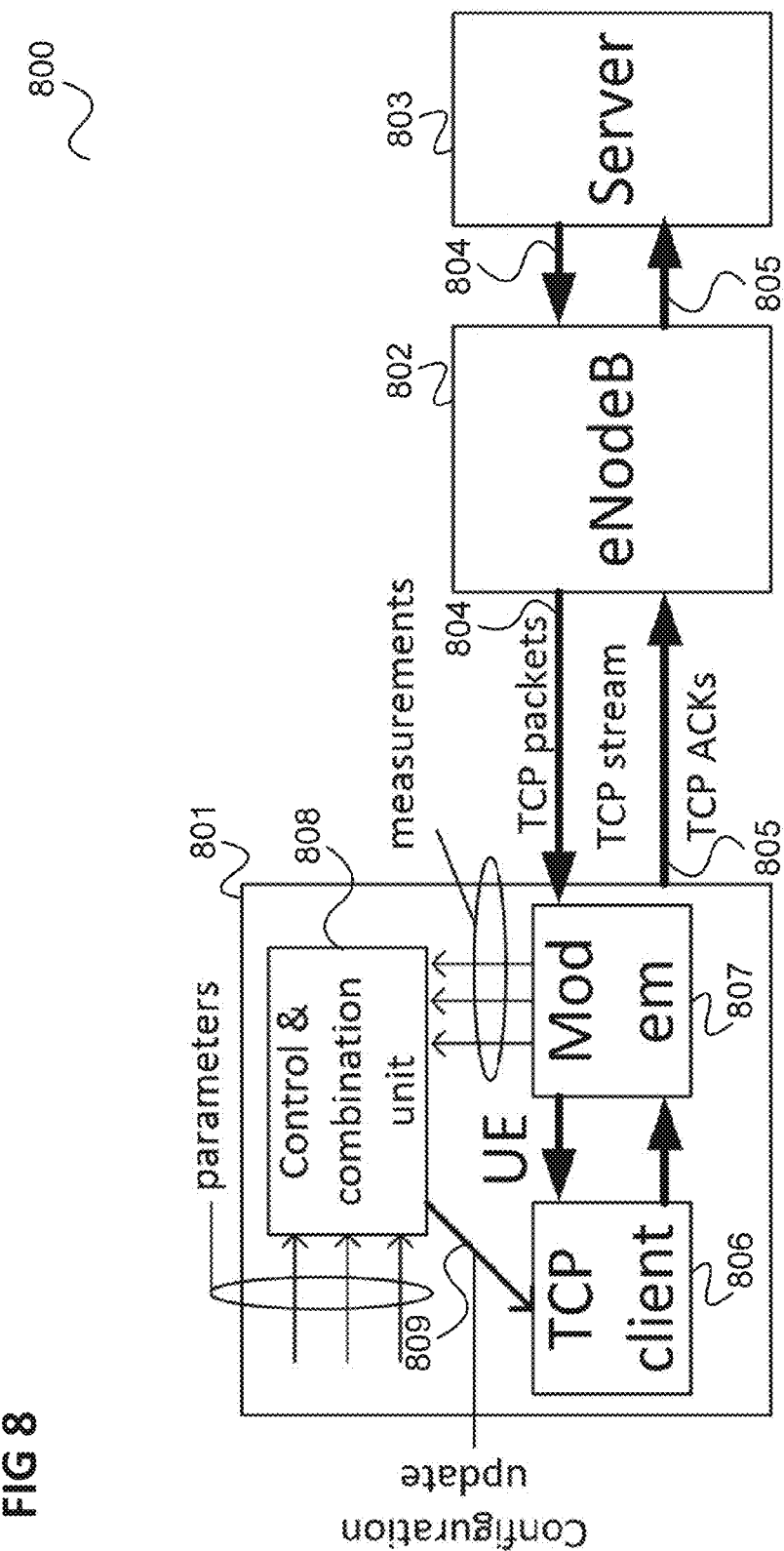
FIG. 8 illustrates the processing for adjusting the TCP window/memory size in the communication arrangement of FIG. 2.

FIG. 8 illustrates the processing for adjusting the TCP window/memory size in the communication arrangement of FIG. 2.

The communication arrangement 800 of FIG. 8 corresponds to the communication arrangement 200 and accordingly comprises a mobile terminal 801, a base station 802 and a server 803.

The server 803 sends a TCP packet stream 804 to the base station 802 which forwards it to the UE 801. The UE 801 sends TCP ACKs 805 for received packets to the base station 802 which forwards them to the server 803.

The UE 801 comprises a TCP client 806 which handles the reception of TCP packets and the sending of TCP ACKs by means of a modem 807. The UE 801 further comprises a controller (control and combination unit) 808 which receives the results of one or more measurements, e.g. as described above, in this example provided by the modem 807 and performed based on signals received by the modem 807 from the base station 802 and receives (or determines) parameters, e.g. as described above. Based on this information (measurement results and parameters), the controller 808 determines a transmission window/memory size (or generally a throughput) to be used for the connection between server 803 and base station 802. For example, the controller 808 sends a configuration update 809 to the TCP client 806 if it determines that the transmission window/memory size should be changed. The TCP client 806 then informs the server accordingly.

Figure 9:
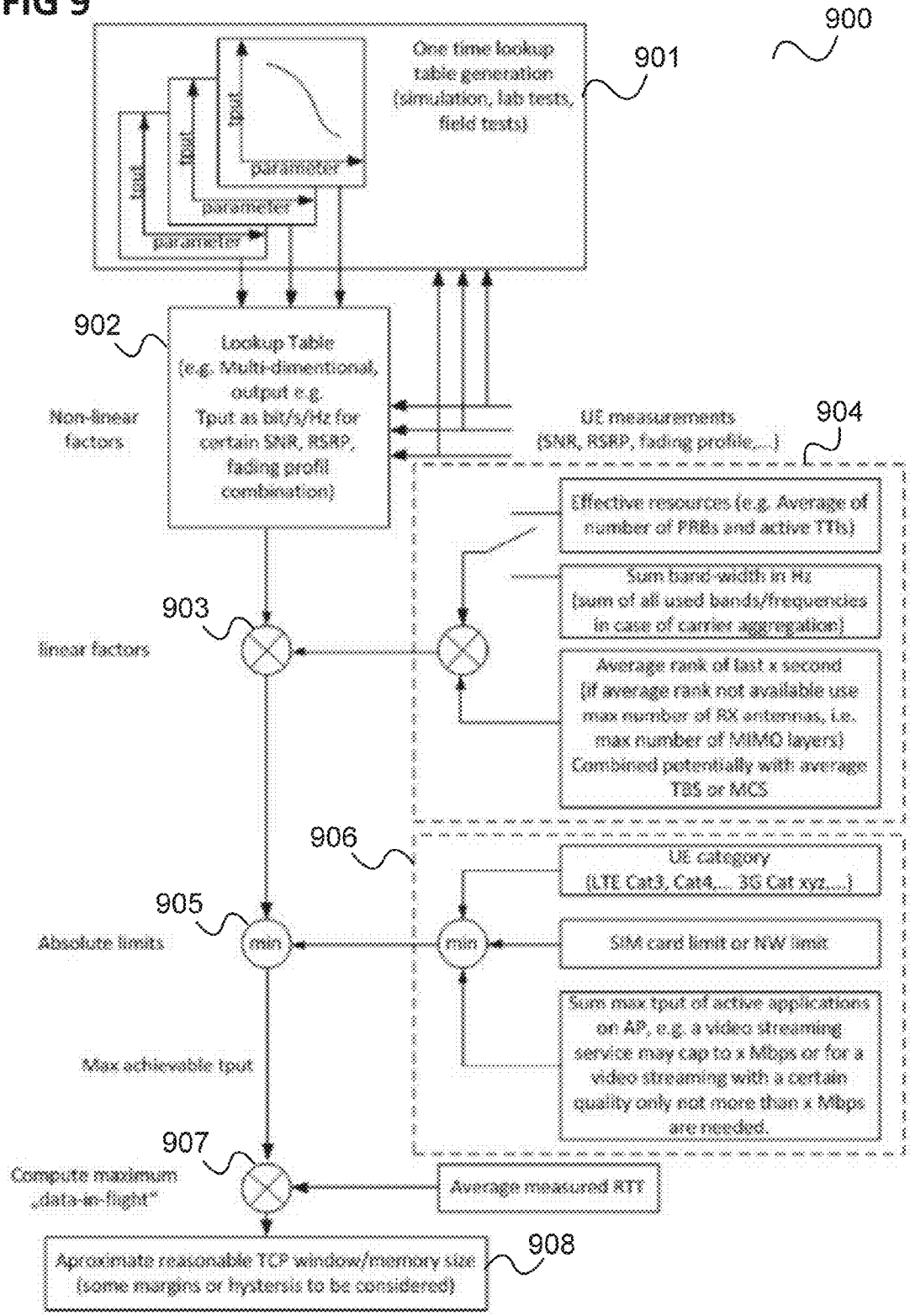
FIG. 9 shows a flow diagram illustrating an exemplary calculation flow to compute a maximum TCP window/memory.

FIG. 9 shows a flow diagram 900 illustrating an exemplary calculation flow to compute an approximate realistic maximum TCP window/memory based on measurements and parameters such as for example listed above as it is for example carried out by the controller 808. It should be noted that not all inputs (measurement results and parameters) shown in FIG. 9 need to be used and other inputs may as well be used.

In 901, a one time lookup table generation is performed for a UE measurements (such as SNR, RSRP and fading profile measurements) based on simulations, lab tests or field tests resulting in a lookup table 902.

In practical application for a certain transmission scenario the UE 801, e.g. the controller 808, feeds the result of UE measurements to the lookup table 902 and gets a certain maximum throughput as result, e.g. a throughput for a certain SNR, RSRP and fading profile combination.

This maximum throughput is then multiplied 903 with the result of a linear factor generation 904. The result of the linear factor generation 904 is for example in case of a MIMO (multiple input multiple output) communication generated by multiplying the UE's effective communication resources (e.g. the average number of PRBs and active TTIs) or the total available band-width (e.g. the sum of all used bands/frequencies in case of carrier aggregation) with the average rank of the last x seconds (x being a predetermined number). If the average rank is not available the UE 801 may for example use the maximum number of available receive antennas, i.e. the maximum number of MIMO layers. It may combine the average rank with the average transport block size or modulation and coding scheme.

The result of the multiplication 903 is then limited 905 by the result of a limit calculation 906 which for example takes the minimum among the throughput possible for the respective UE category (e.g. LTE Cat3, Cat4, etc. or 3G, etc.), the SIM card limit or network limit and the sum of the maximum throughputs of the applications running on the UE. For example, a video streaming application may be capped to a certain number x of Mbps or for a certain quality not more than x Mbps are needed.

The result of the limiting 905 is the maximum throughput. This maximum throughput is then multiplied in 907 with the average measured RTT to generate the TCP window/memory size 908 which the UE 801 may then report to the server 803, wherein it may take into account certain margins or a hysteresis.

Figure 10:
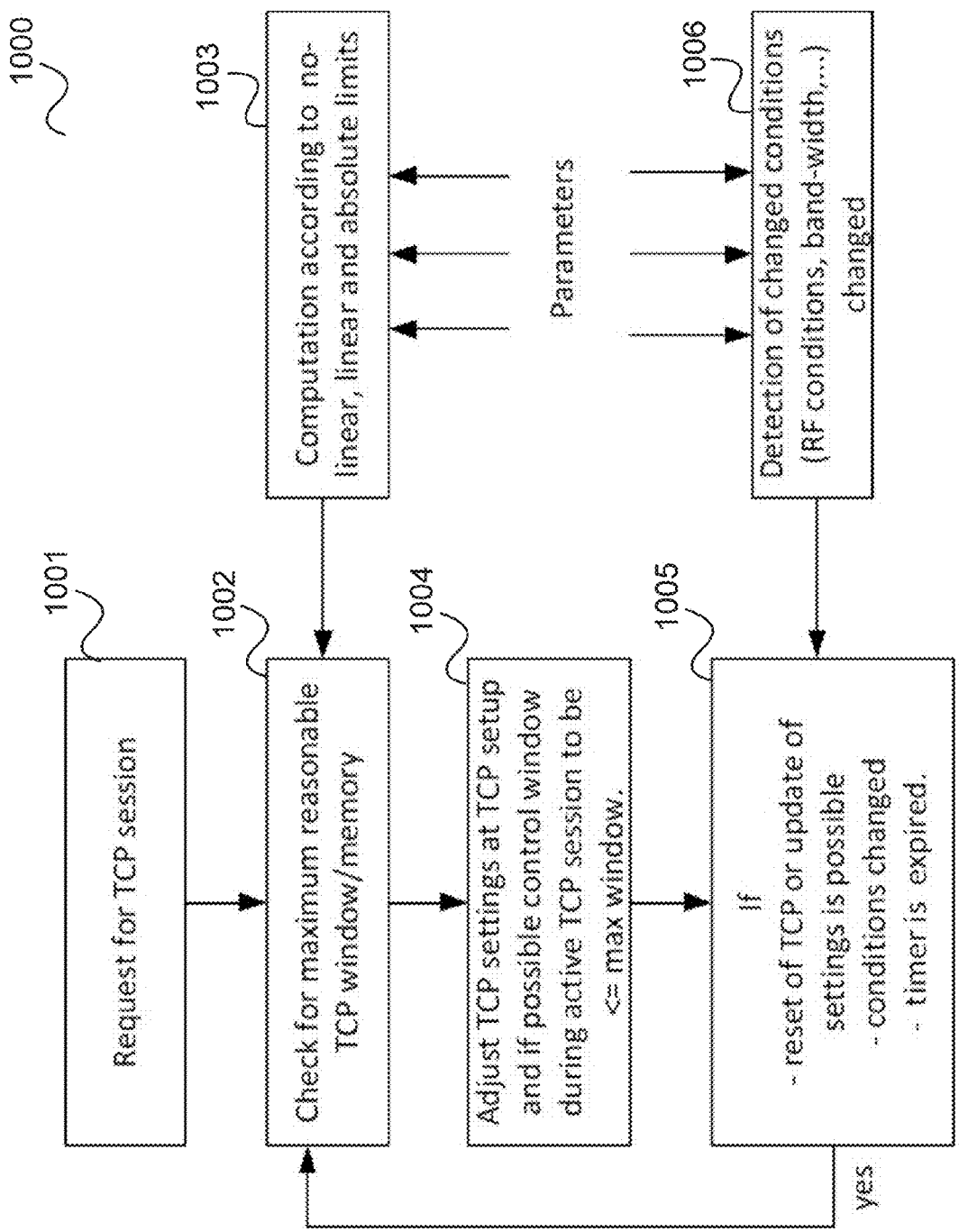
FIG. 10 shows a flow diagram illustrating how the process illustrated in FIG. 9 and its result is for example used.

FIG. 10 shows a flow diagram 1000 illustrating a higher level flow, i.e. how the process illustrated in FIG. 9 and its result is for example used.

The processing illustrated in FIG. 10 is for example carried out by the controller 808.

In 1001, the controller receives a request for a TCP session, e.g. from an application running on an application processor of the mobile terminal 801.

In 1002, the controller checks for the maximum TCP window/memory. For this, the controller in 1003 performs a computation according to nonlinear, linear and absolute limits for example as described in FIG. 9.

In 1004, the controller sets the TCP window/memory to be smaller or equal to the maximum TCP window/memory found in 1002.

In 1005, if there is a reset of the TCP connection or an update of the TCP settings is possible, or if the controller detects in 1006 that conditions affecting the quality of the wireless link (such as the radio conditions or the available bandwidth) have change or a certain timer has required, the controller returns to 1002 i.e. re-checks for the maximum TCP window/memory.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A user equipment device (UE device) comprising:
a quality determiner circuit configured to determine a quality parameter for a wireless communication link between the UE device and a radio access network component based on one or more signals received via the wireless communication link;
a throughput determiner circuit configured to determine, based on the quality parameter, a throughput of a communication connection between the radio access network component and a server to be used for transmitting data from the server to the UE device via the communication connection and the wireless communication link;
a maximum throughput determiner circuit configured to determine a maximum throughput based on the throughput and a result of a linear factor generation; and
a controller configured to control the maximum throughput to be used for transmission of data via the communication connection from the server to the radio access network component according to the determined maximum throughput.

2. The user equipment device (UE device) of claim 1, wherein controlling a maximum throughput comprises receiving data via the communication connection between the radio access network component and the server according to the determined maximum throughput.

3. The user equipment device (UE device) of claim 2, wherein the controller is further configured to derive a maximum throughput parameter from the determined maximum throughput.

4. The user equipment device (UE device) of claim 2, wherein the connection between the radio access network component and the server is a TCP connection and the maximum throughput parameter is a TCP receive window size.

5. The user equipment device (UE device) of claim 1, further comprising a receiver configured to receive data from the server via the communication connection and the wireless communication link.

6. The user equipment device (UE device) of claim 5, wherein the receiver is configured to receive the one or more signals from the radio access network component and wherein the quality determiner circuit is configured to measure the quality parameter based on the reception of the one or more signals.

7. The user equipment device (UE device) of claim 6, wherein the quality parameter is based on a signal to noise measurement of the received one or more signals.

8. The user equipment device (UE device) of claim 1, wherein the quality parameter is a round trip time between the communication terminal and the server.

9. The user equipment device (UE device) of claim 1, wherein the throughput determiner circuit is configured to determine the throughput based on the quality parameter and an additional parameter characterizing a performance of the wireless communication link.

10. The user equipment device (UE device) of claim 9, wherein the additional parameter specifies a throughput limit of the wireless communication link or an amount of communication resources available for the wireless communication link.

11. The user equipment device (UE device) of claim 1, wherein the throughput determiner circuit is configured to determine the throughput based on the quality parameter by means of a predetermined lookup table.

12. A method for controlling a data transmission comprising:
    determining a quality parameter for a wireless communication link between a user equipment device (UE) and a radio access network component based on one or more signals received by the user equipment device (UE) via the wireless communication link;
    determining, based on the quality parameter, a throughput of a communication connection between the radio access network component and a server to be used for transmitting data from the server to the user equipment device (UE) via the communication connection and the wireless communication link;
    determining a maximum throughput based on the throughput and a result of a linear factor generation determined; and
    controlling the maximum throughput to be used for transmission of data via the communication connection from the server to the radio access network component according to the determined maximum throughput.

13. The method of claim 12, wherein controlling a maximum throughput comprises receiving or transmitting data via the communication connection between the radio access network component and the server according to the determined maximum throughput.

14. The method of claim 13, comprising deriving a maximum throughput parameter from the determined maximum throughput.

15. The method of claim 13, wherein the connection between the radio access network component and the server is a TCP connection and the maximum throughput parameter is a TCP receive window size.

16. The method of claim 12, further comprising receiving data from the server via the communication connection and the wireless communication link.

17. The method of claim 16, comprising receiving the one or more signals from the radio access network component and measuring the quality parameter based on the reception of the one or more signals.

18. A computer readable non-transitory medium having recorded instructions thereon which, when executed by a processor, make the processor perform a method for controlling a data transmission according to claim 12.

19. A communication terminal comprising:
    a quality determiner circuit configured to determine a quality parameter for a wireless communication link between the communication terminal and a radio access network component based on one or more signals received via the wireless communication link;
    a throughput determiner circuit configured to determine, based on the quality parameter, a throughput of a communication connection between the radio access network component and a server to be used for transmitting data from the server to the communication terminal via the communication connection and the wireless communication link;
    a linear factor generation circuit configured to determine a linear factor generation;
    a maximum throughput determiner circuit configured to determine a maximum throughput based on the throughput and a result of the linear factor generation; and
    a controller configured to dynamically control the maximum throughput to be used for transmission of data via the communication connection from the server to the radio access network component according to the determined maximum throughput.

20. The communication terminal of claim 19, wherein the linear factor generation comprises at least one of physical resource blocks (PRB), time transmission intervals (TTI), available bandwidth, and combinations thereof.

* * * * *